(12) United States Patent
Thomas

(10) Patent No.: US 11,372,318 B2
(45) Date of Patent: Jun. 28, 2022

(54) CAMERA GIMBAL

(71) Applicant: Kevin Albert Thomas, Langhorne, PA (US)

(72) Inventor: Kevin Albert Thomas, Langhorne, PA (US)

(*) Notice: Subject to any disclaimer, the term of this patent is extended or adjusted under 35 U.S.C. 154(b) by 0 days.

(21) Appl. No.: 17/076,110

(22) Filed: Oct. 21, 2020

(65) Prior Publication Data

US 2021/0033950 A1 Feb. 4, 2021

Related U.S. Application Data

(63) Continuation-in-part of application No. 16/424,581, filed on May 29, 2019, now Pat. No. 10,844,998.

(60) Provisional application No. 62/677,505, filed on May 29, 2018.

(51) Int. Cl.
| | |
|---|---|
| *G03B 17/56* | (2021.01) |
| *F16M 11/20* | (2006.01) |
| *F16M 11/18* | (2006.01) |
| *F16M 11/04* | (2006.01) |
| *F16M 11/10* | (2006.01) |
| *F16M 11/12* | (2006.01) |

(52) U.S. Cl.
CPC .......... *G03B 17/561* (2013.01); *F16M 11/04* (2013.01); *F16M 11/10* (2013.01); *F16M 11/12* (2013.01); *F16M 11/18* (2013.01); *F16M 11/205* (2013.01); *F16M 11/2078* (2013.01); *G03B 17/56* (2013.01)

(58) Field of Classification Search
CPC ........ G03B 17/56; F16M 11/04; F16M 11/10; F16M 11/12; F16M 11/18

USPC ...... 396/428; 248/186.1, 187.1, 176.3, 183.4
See application file for complete search history.

(56) References Cited

U.S. PATENT DOCUMENTS

| | | | | |
|---|---|---|---|---|
| 4,017,168 A | * | 4/1977 | Brown ................. | G03B 17/561 352/243 |
| 4,318,522 A | * | 3/1982 | Appleberry ............. | B64G 1/66 248/179.1 |
| 4,886,230 A | * | 12/1989 | Jones .................... | F16M 11/28 248/170 |
| 5,098,182 A | * | 3/1992 | Brown ................. | F16M 11/123 352/243 |
| 5,135,196 A | * | 8/1992 | Schehr .................. | F16M 11/14 248/287.1 |
| 5,366,193 A | * | 11/1994 | Lindsay .................... | F16F 9/12 248/183.2 |

(Continued)

*Primary Examiner* — Clayton E. LaBalle
*Assistant Examiner* — Kevin C Butler
(74) *Attorney, Agent, or Firm* — Howson & Howson LLP

(57) ABSTRACT

A camera gimbal is provided having first and second arms, a support connected to the second arm and having an upper end to which a camera may be mounted and a lower end to which a counterweight is connected, and a gearbox including a gear and a rotary damper. The second arm is rotatable relative to the first arm and includes a proximal end portion forming a housing for the gearbox and a distal end portion to which the support is connected. The camera gimbal is purely-mechanical in operation and is without connection to a power source relying solely on gravity acting on a camera mounted on the support and the counterweight to cause rotation of the first arm relative to the second arm to maintain the camera in a relatively level position while the rotary damper damps the rotational movement.

14 Claims, 13 Drawing Sheets

(56) References Cited

U.S. PATENT DOCUMENTS

| | | | | |
|---|---|---|---|---|
| 5,737,657 A * | 4/1998 | Paddock | ............ | F16M 11/041 |
| | | | | 396/428 |
| 7,090,416 B2 * | 8/2006 | Mootz | ............ | G03B 17/563 |
| | | | | 396/421 |
| 7,475,613 B2 * | 1/2009 | Bailey | ............ | B23Q 1/5412 |
| | | | | 248/181.1 |
| 8,029,197 B2 * | 10/2011 | McKay | ............ | F16M 11/2057 |
| | | | | 396/421 |
| 8,714,744 B2 * | 5/2014 | Greaves | ............ | G03B 17/00 |
| | | | | 352/243 |
| 9,201,292 B1 * | 12/2015 | Folgarelli | ............ | G03B 17/02 |
| 9,874,308 B2 * | 1/2018 | Saika | ............ | B64D 47/08 |
| 9,904,149 B2 * | 2/2018 | Casarez | ............ | G03B 17/566 |
| 2002/0090216 A1 * | 7/2002 | Melitopoulos | ....... | F16M 11/045 |
| | | | | 396/428 |
| 2005/0135874 A1 * | 6/2005 | Baylis | ............ | F16M 13/02 |
| | | | | 403/76 |
| 2005/0196163 A1 * | 9/2005 | Mootz | ............ | F16M 11/041 |
| | | | | 396/428 |
| 2006/0231700 A1 * | 10/2006 | Orf | ............ | F16M 13/02 |
| | | | | 248/187.1 |
| 2006/0262274 A1 * | 11/2006 | Brown | ............ | F16M 13/04 |
| | | | | 352/243 |
| 2007/0155228 A1 * | 7/2007 | Nama | ............ | F16M 11/10 |
| | | | | 439/567 |
| 2009/0003822 A1 * | 1/2009 | Tyner | ............ | G03B 17/563 |
| | | | | 396/428 |
| 2011/0080563 A1 * | 4/2011 | Greaves | ............ | G03B 17/00 |
| | | | | 352/243 |
| 2012/0081670 A1 * | 4/2012 | Greaves | ............ | G03B 17/561 |
| | | | | 352/243 |
| 2013/0236167 A1 * | 9/2013 | Tardieu | ............ | F16M 11/2078 |
| | | | | 396/428 |
| 2017/0064176 A1 * | 3/2017 | Kim | ............ | F16M 11/041 |
| 2017/0163896 A1 * | 6/2017 | Kang | ............ | B64C 39/024 |
| 2018/0266621 A1 * | 9/2018 | Zhang | ............ | F16M 11/12 |
| 2019/0368654 A1 * | 12/2019 | Thomas | ............ | F16M 13/04 |
| 2021/0033950 A1 * | 2/2021 | Thomas | ............ | F16M 11/2078 |

* cited by examiner

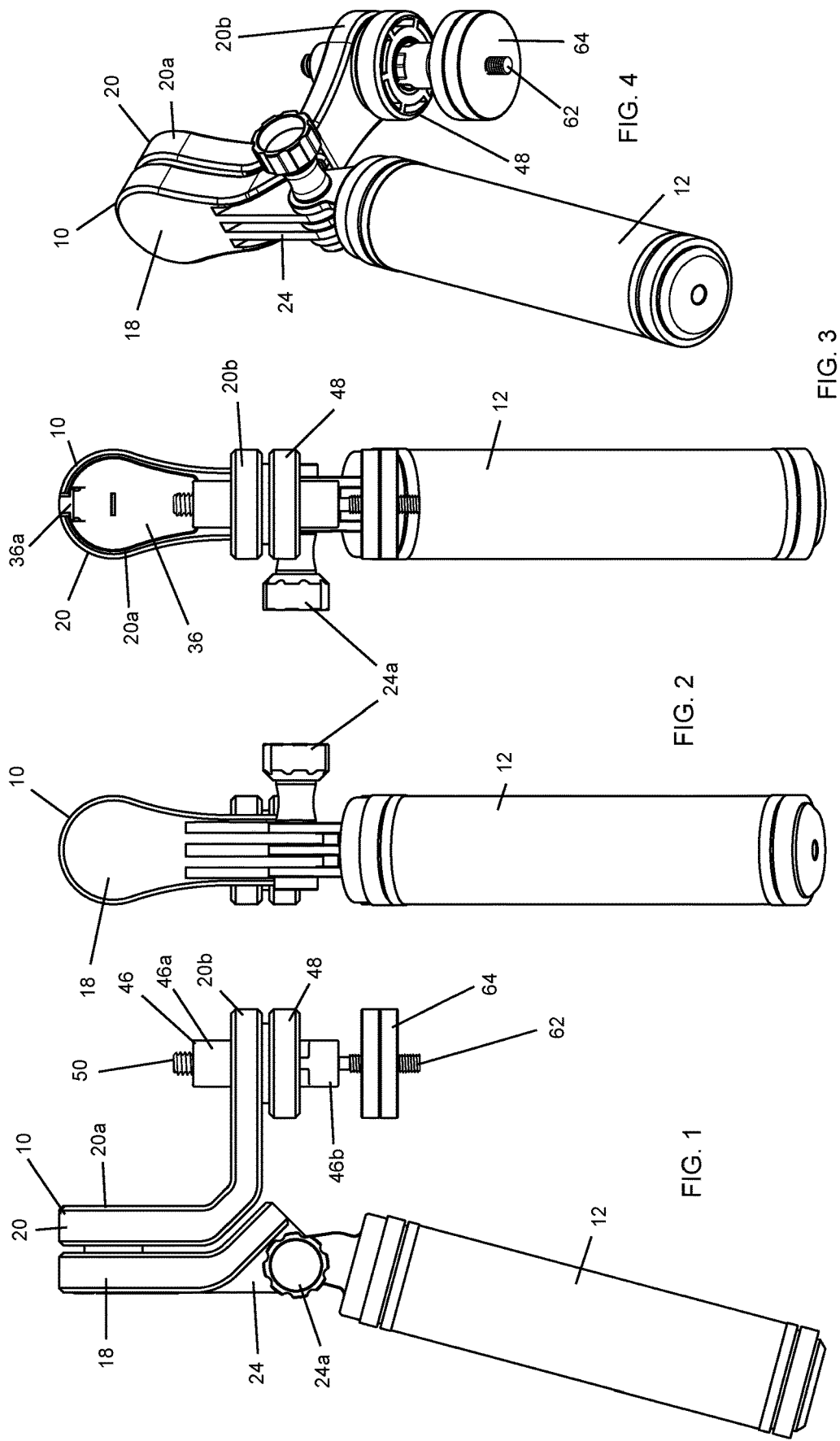

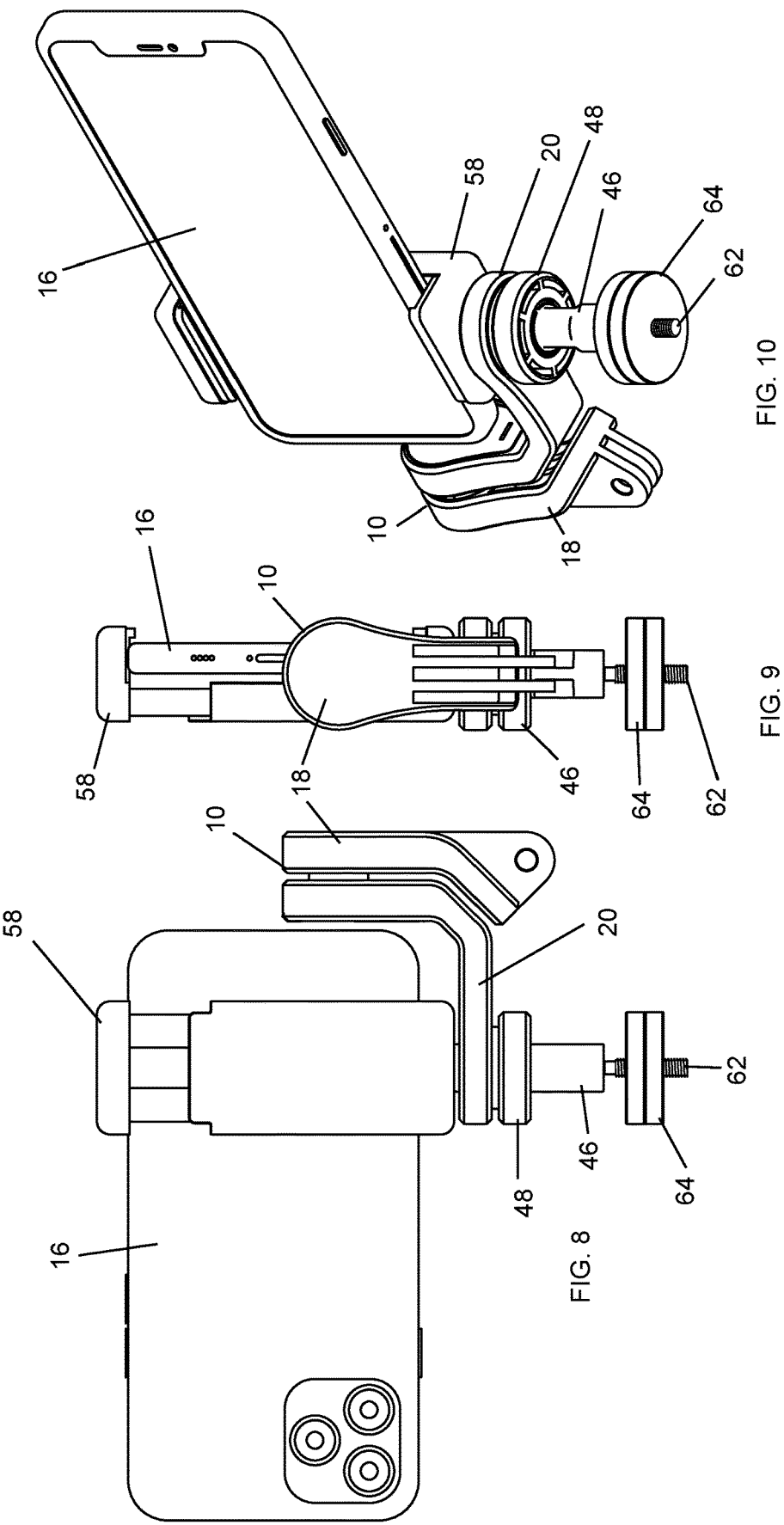

CAMERA GIMBAL

CROSS REFERENCE TO RELATED APPLICATIONS

This application is a continuation-in-part of co-pending U.S. patent application Ser. No. 16/424,581 filed on May 29, 2019, which claims the benefit under 35 USC § 119(e) of U.S. Provisional Patent Application No. 62/677,505, filed May 29, 2018.

BACKGROUND

The present invention relates to stabilizing videography footage.

Shaky or blurred images are often produced by a camera held or secured to a moving person or object as the movement of the person or object is necessarily transmitted to the camera. For example, a digital camera, a smartphone having a camera, or like electronic device may be held by a user performing an activity (i.e., skateboarding, bicycling, skiing, or other activity) or may be mounted to an object in motion. As a result, the motion may affect the quality of the media captured by the camera, causing blurry pictures, shaky footage, or other low-quality media. This can also result when repositioning a camera secured to a tripod.

A user may secure their camera to a gimbal, which is a device that can manipulate the orientation of the camera so as to correct for movement. Thus, the use of a gimbal provides a camera stabilization technique that can reduce the effects of motion on images, particularly video, recorded by the camera.

Consumers often will own different types of cameras having different characteristics such as size, weight, and the like. For instance, a consumer may have a relatively small, thin, and lightweight smartphone with a camera and may also have one or more relatively larger and/or heavier digital cameras. A gimbal is typically designed to support only a particular type of camera in a balanced manner which takes into account only a limited range of size and weight of the camera.

SUMMARY

According to an embodiment, a camera gimbal is provided. The camera gimbal includes first and second arms, a support connected to the second arm and having an upper end to which a camera may be mounted and a lower end to which a counterweight is connected, and a gearbox having a gear secured to a bearing shaft and a rotary damper engaged with the gear in a manner permitting rotation of the rotary damper about a periphery of the gear and about an axis of rotation extending longitudinally through the bearing shaft and the gear. The bearing shaft extends from the first arm, and the second arm is rotatable relative to the first arm about the axis of rotation extending through the bearing shaft. The second arm has a proximal end portion forming a housing for the gearbox and a distal end portion to which the support is connected such that the upper end of the support projects above the distal end portion of the second arm and the lower end of the support extends below the distal end portion of the second arm. Accordingly, the camera gimbal is purely-mechanical in operation and is without connection to a power source relying solely on gravity acting on a camera mounted on the support and the counterweight to cause rotation of the first arm relative to the second arm to maintain the camera mounted on the support in a relatively level position while the rotary damper damps the rotational movement of the first arm relative to the second arm.

According to an embodiment, the support is a support post, and the distal end portion of the second arm has a channel extending therethrough through which the support post extends. Accordingly, the support post can be secured within the channel at numerous locations along a length of the support post so that a height at which the upper end of the support post projects (and at which a camera is mounted) above the distal end portion of the second arm is adjustable.

According to a further embodiment, a shaft extends from the lower end of the support post and the counterweight is adjustably secured to the shaft such that the counterweight can be positioned closer to or further away from the distal end portion of the second arm for adjusting rotational speed of the second arm relative to the first arm.

According to a further embodiment, the shaft interconnects to the support post via a joint, such as a ball joint. Accordingly, the shaft can be repositioned to extend to a laterally offset position relative to the upper end of the support post for purposes of offsetting the position of the counterweight to enable balance correction.

According to a further embodiment, the second arm includes a removable lid forming part of a housing of the gearbox. The rotary damper is secured to the lid. Accordingly, the damping of the rotation of the second arm relative to the first arm provided by the rotary damper may be disengaged by removal of the lid from the second arm.

According to another embodiment, a camera gimbal includes a first arm to which a handle may be mounted and a second arm having a proximal end portion interconnected to the first arm via a gearbox such that the second arm is rotatable relative to the first arm. The gear box includes a gear secured to a bearing shaft and a rotary damper engaged with the gear in a manner permitting rotation of the rotary damper about a periphery of the gear and about an axis of rotation extending longitudinally through the bearing shaft and the gear. A support post has an intermediate portion extending through and securable to a distal end portion of the second arm. A camera may be mounted to an upper end of the support post, and a counterweight is secured to a lower end of the support post. The lower end of the support post includes a joint permitting the counterweight to be positioned in an offset position relative to the upper end of the support post to provide balance correction. The camera gimbal is purely-mechanical in operation and is without connection to a power source relying solely on gravity acting on a camera mounted on the support post and the counterweight to cause rotation of the first arm relative to the second arm to maintain the camera mounted on the second arm in a relatively level position while the rotary damper damps the rotational movement of the first arm relative to the second arm.

BRIEF DESCRIPTION OF THE DRAWINGS

The foregoing and other objects, features and advantages of the embodiments disclosed herein should become apparent from the following description when taken in conjunction with the accompanying drawings.

FIG. 1 is a side elevational view of a camera gimbal mounted to a handle according to an embodiment;

FIG. 2 is a rear elevational view of the camera gimbal and handle of FIG. 1;

FIG. 3 is a front elevational view of the camera gimbal and handle of FIG. 1;

FIG. 4 is a perspective view of the camera gimbal and handle of FIG. 1;

FIG. 8 is a front elevational view of a smartphone mounted in a tilt position on the camera gimbal of FIG. 1;

FIG. 9 is a side elevational view of the smartphone and camera gimbal of FIG. 8;

FIG. 10 is a perspective view of the smartphone and camera gimbal of FIG. 8;

DETAILED DESCRIPTION

Figure 7:
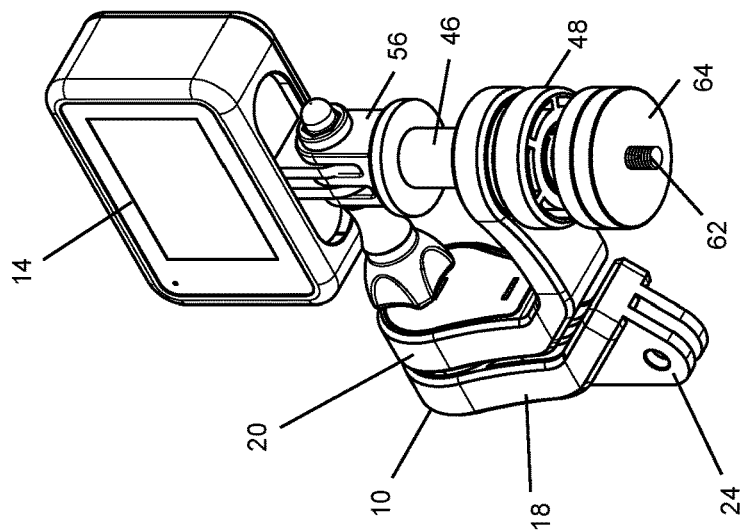
FIG. 7 is a perspective view of the camera and camera gimbal of FIG. 5.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to embodiments, a camera gimbal is provided that ensures smooth and stable movement of a camera, smartphone, or other electronic device mounted therein. For purposes of this disclosure, the term "camera" shall apply to all devices capable of taking video including digital cameras, smartphones, and the like electronic recording or streaming devices.

The camera gimbal may be mounted on the end of an elongate portable pole or handle or like equipment held, attached to, or controlled by a person in motion or in a stationary position. The gimbal comprises at least one purely mechanical gearbox defining at least one rotational axis and set to automatically control the speed of rotation of the camera about the axis. The resistance of at least one rotary gear or other energy-absorbing mechanism in the gearbox eliminates or reduces vibrations of the camera as it is moved while the camera captures video and/or still images.

According to embodiments, each gearbox may contain a central main gear through which an axis of rotation is defined and at least one rotary damper, such as a hydraulic rotary damper gear or the like, engaged to the central gear along a periphery thereof for traveling in a circular path about the periphery. The specific rotary damper and/or the number of rotary dampers may be selected to produce the desired damping affects.

According to embodiments, a camera mount or the like to which a camera may be adjustably mounted in a balanced manner on the gimbal may extend from the gearbox and/or may form an end part of the gearbox. The camera mount may automatically be maintained in or returned to a position extending upright and parallel to the ground by balance weights or the like such that a camera secured thereto may be held in an upright position based solely on the forces of gravity to capture or record images in a substantially level position.

According to embodiments, the camera gimbal may permit ready adjustment of the height of the camera as mounted on the gimbal such that the center of gravity of the camera may be positioned closer to or further away from the rotational axis defined by the camera gimbal. In addition, the position of one or more counter-balance weights on the camera gimbal may be readily adjustable so that the rotational speed of the camera gimbal about the rotational axis is adjustable (i.e., set to be faster or slower). Further, the camera gimbal may be able to provide balance correction, such as to correct for a camera having an offset center of gravity as mounted to the camera gimbal. Still further, the stabilization or damping system provided by the camera gimbal may be readily disengaged if desired by the end user.

By way of example, an embodiment of a camera gimbal 10 is shown in FIGS. 1-4. The camera gimbal 10 is shown connected to a portable handle 12 or the like which can be held by the end user or the like. Of course, the gimbal 10 can be connected to other equipment or the like.

Figure 6:
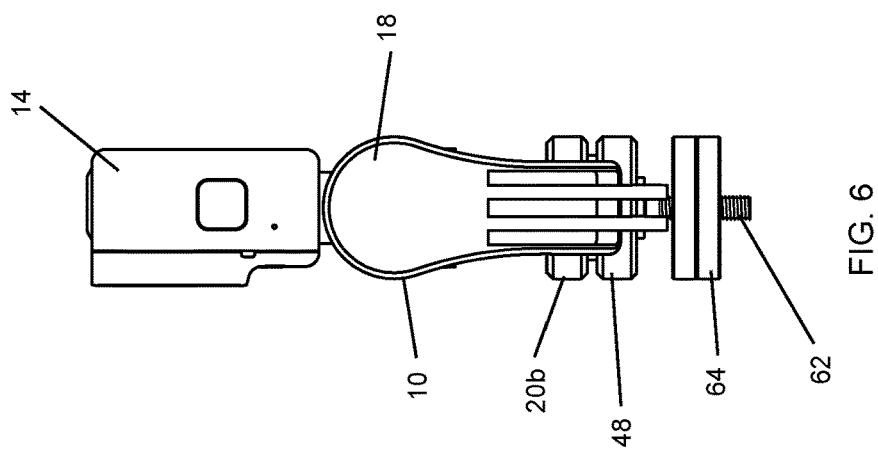
FIG. 6 is a side elevational view of the camera and camera gimbal of FIG. 5.
Figure 5:
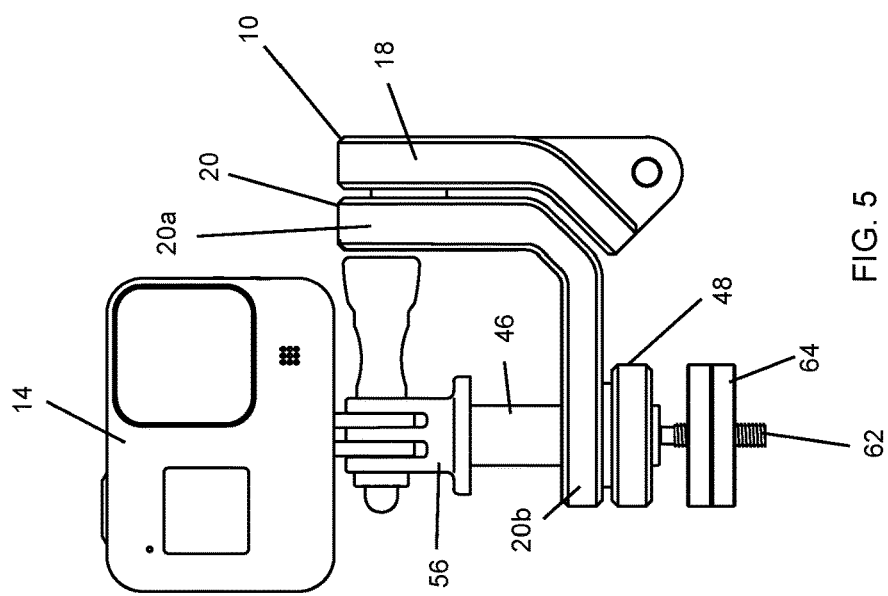
FIG. 5 is an elevational view of a camera mounted in a tilt position on the camera gimbal of FIG. 1.
Figure 13:
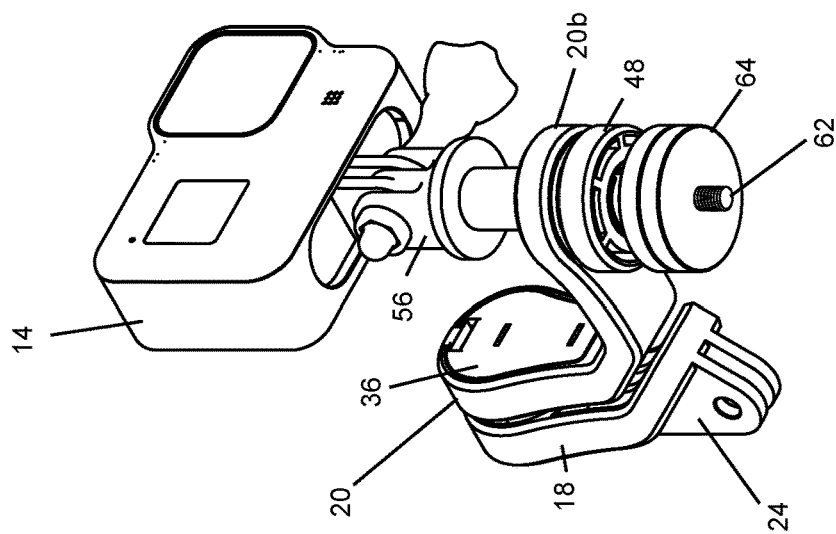
FIG. 13 is a perspective view of the camera and camera gimbal of FIG. 11.
Figure 12:
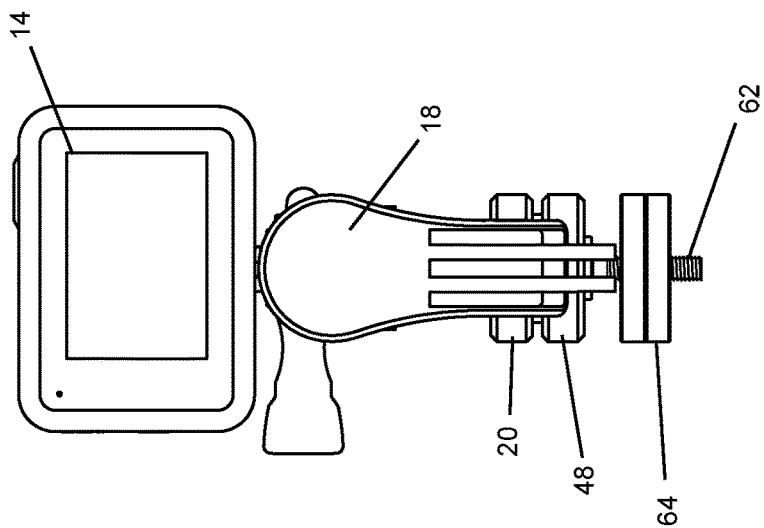
FIG. 12 is a rear elevational view of the camera and camera gimbal of FIG. 11.
Figure 11:
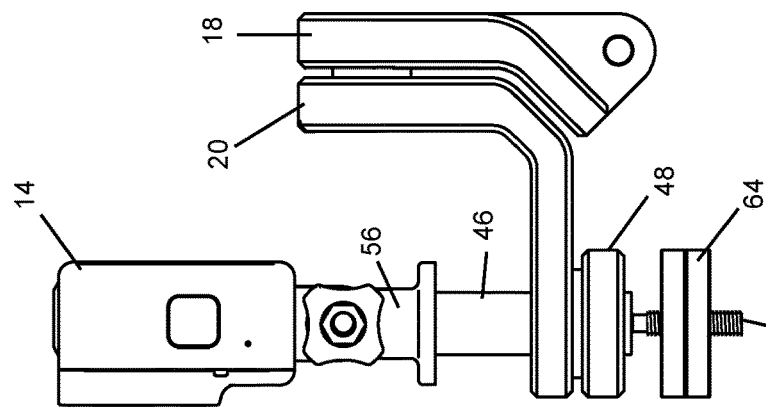
FIG. 11 is a side elevational view of a camera mounted in a roll position on the camera gimbal of FIG. 1.
Figure 16:
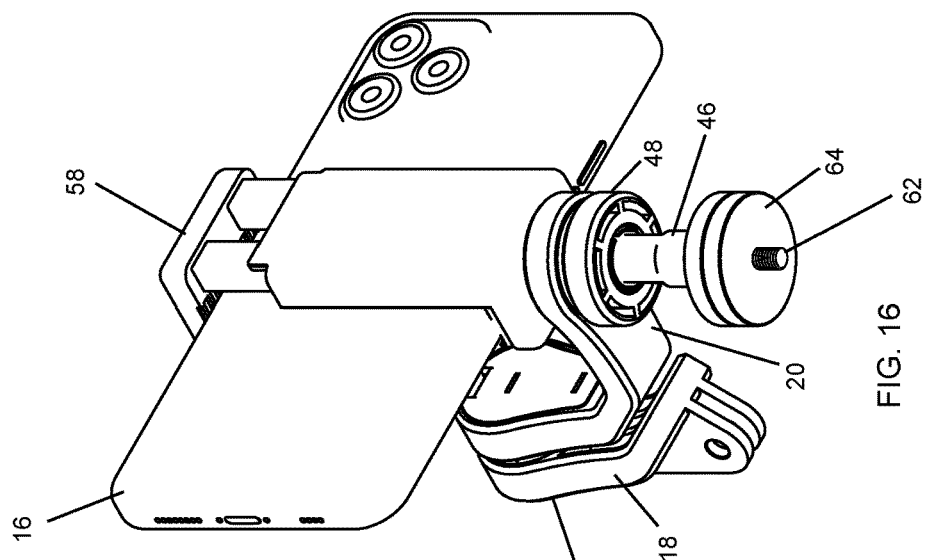
FIG. 16 is a perspective view of the smartphone and camera gimbal of FIG. 14.
Figure 15:
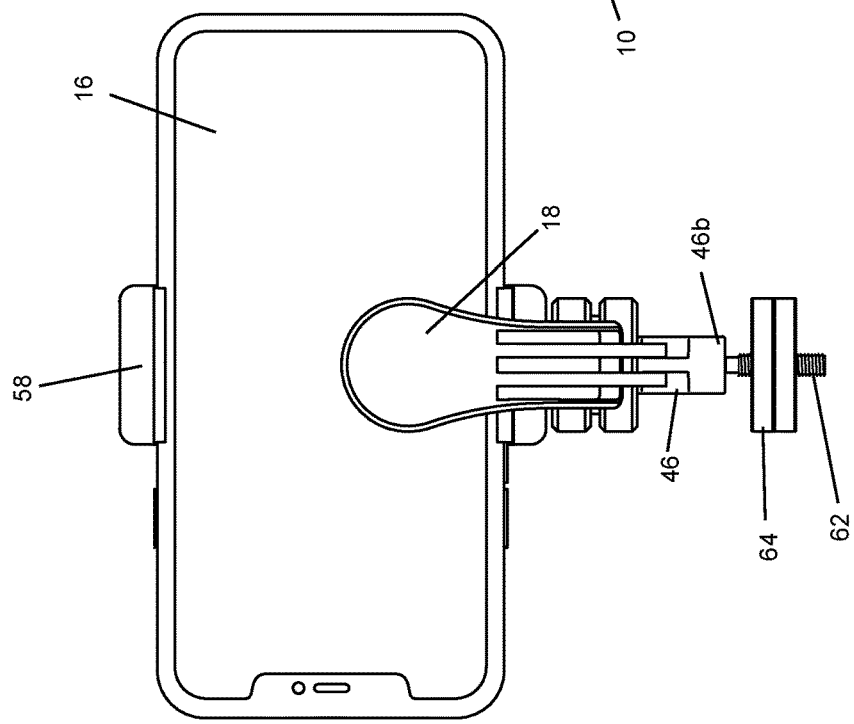
FIG. 15 is a rear elevational view of the smartphone and camera gimbal of FIG. 14.
Figure 14:
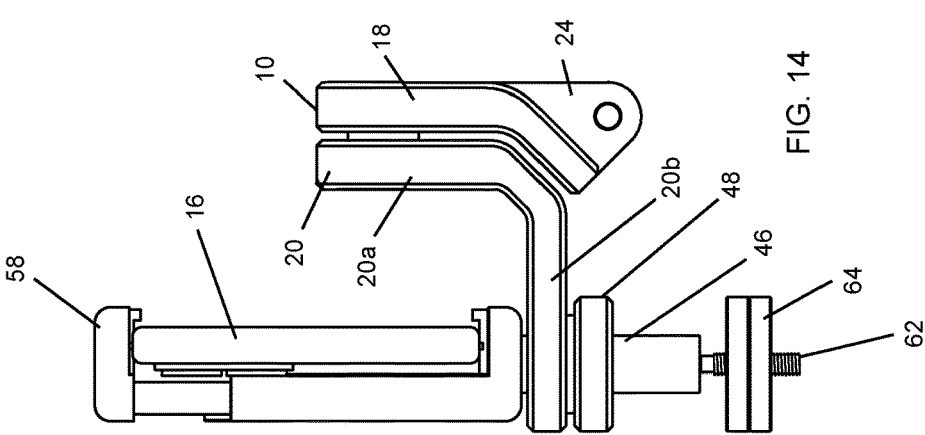
FIG. 14 is a side elevational view of a smartphone mounted in a roll position on the camera gimbal of FIG. 1.

FIGS. 5-15 show a camera 14 and a smartphone 16 having a camera mounted on the gimbal 10 in two different fixed orientations, i.e., a tilt position and roll position. These two positions may be offset by about 90° of rotation. For instance, FIGS. 5-7 show the camera 14 mounted in a tilt position on the gimbal 10; FIGS. 8-10 show the smartphone 16 mounted in the tilt position on the gimbal 10; FIGS. 11-13 show the camera 14 mounted in a roll position on the gimbal 10; and FIGS. 14-16 show the smartphone 16 mounted in the roll position on the gimbal 10.

Figure 17:
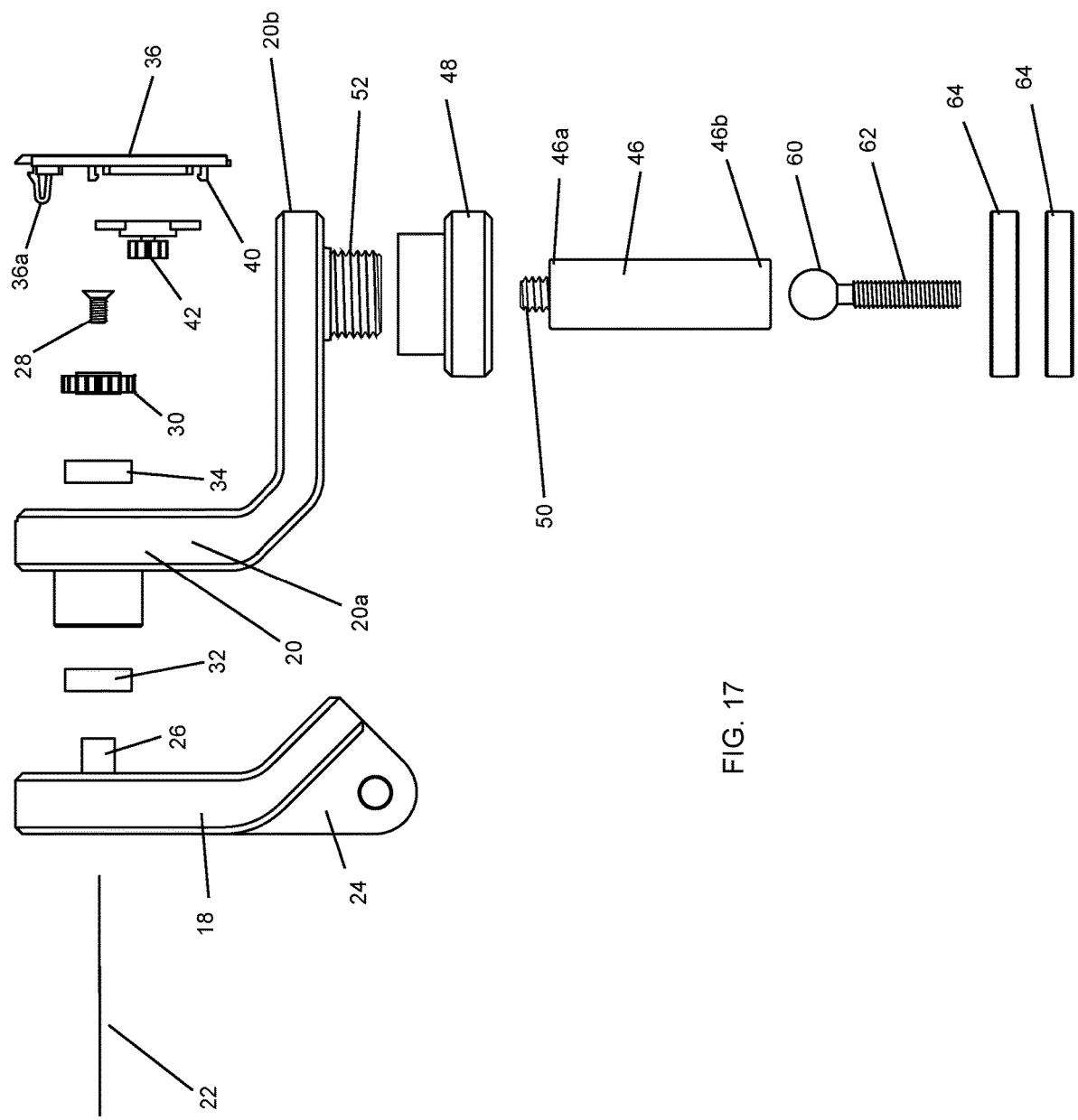
FIG. 17 is an exploded elevational side view of the camera gimbal of FIG. 1.
Figure 18:
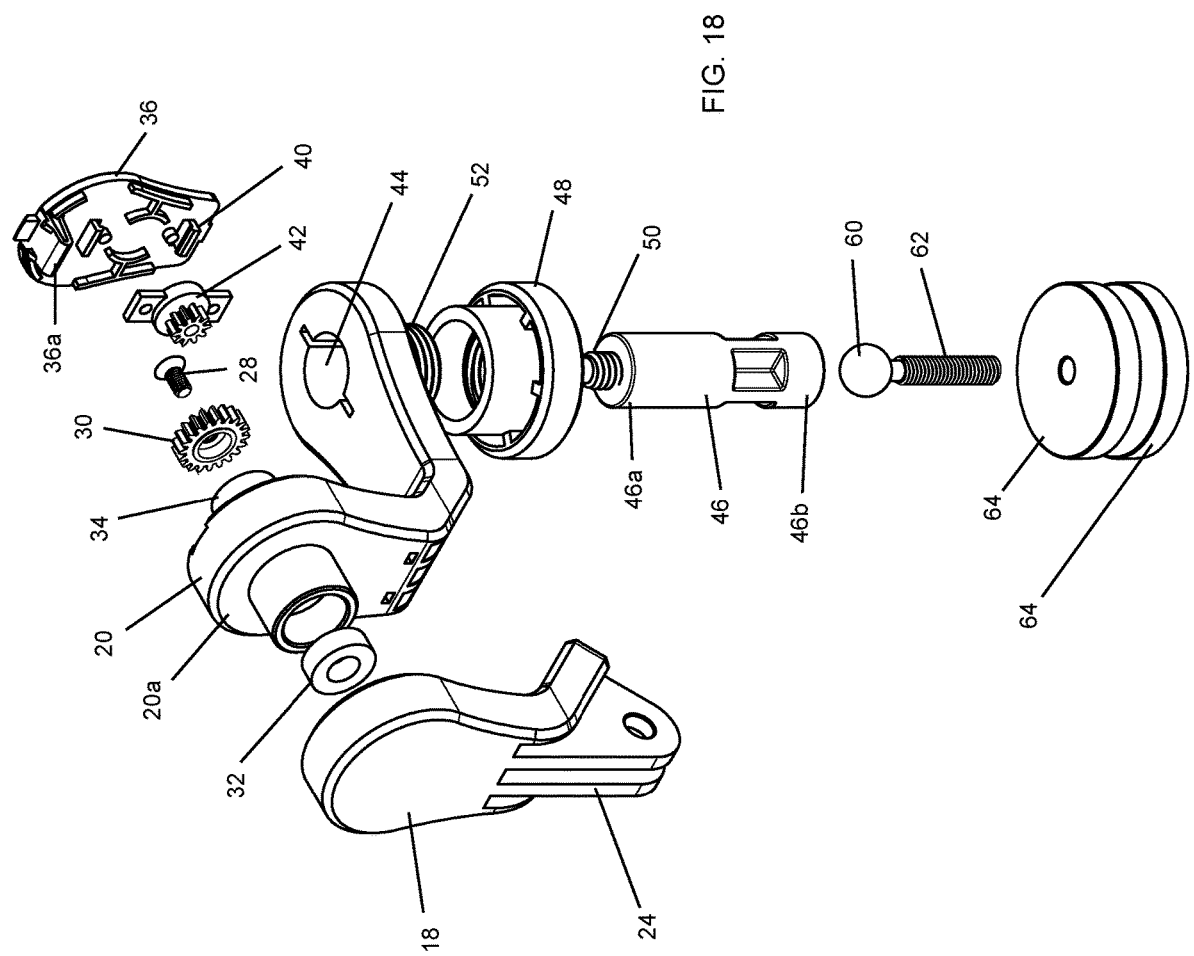
FIG. 18 is an exploded perspective view of the camera gimbal of FIG. 1.
Figure 19:
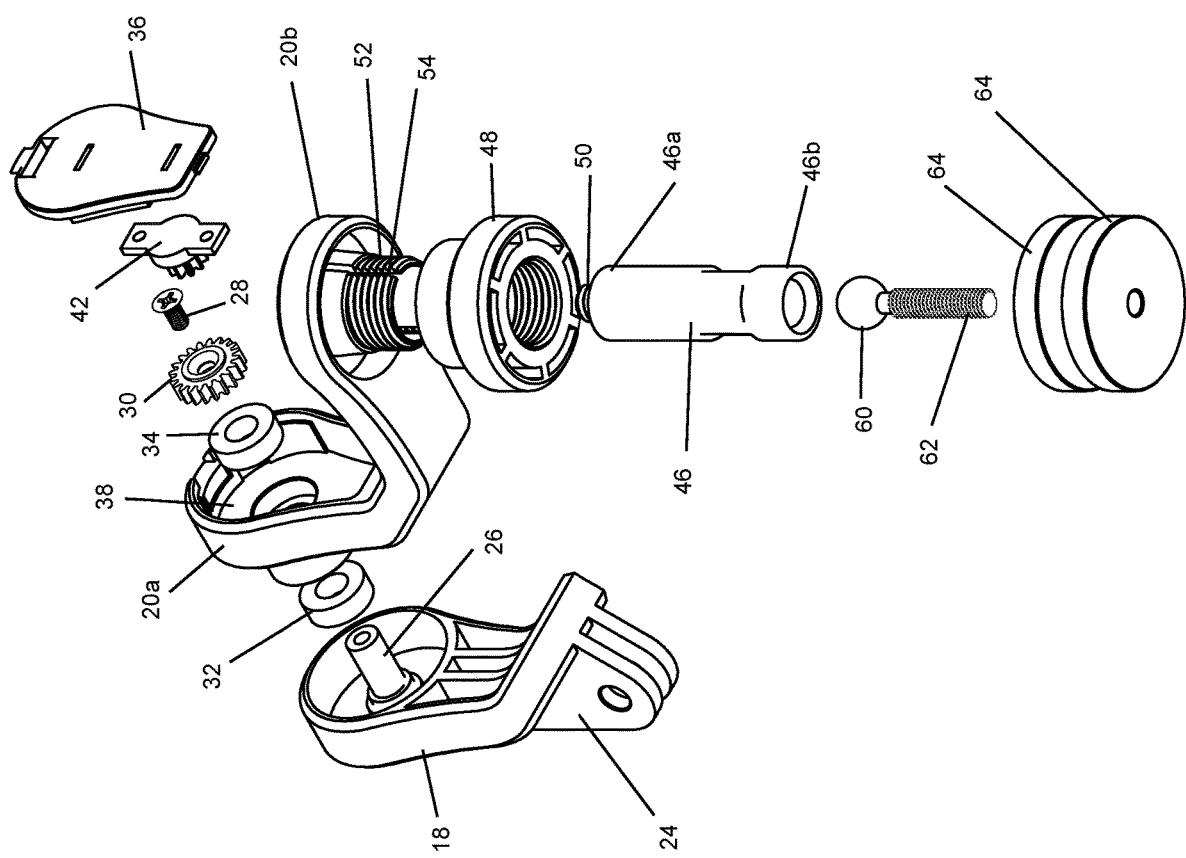
FIG. 19 is an exploded perspective view of the camera gimbal of FIG. 1.

As best shown in FIGS. 17-19 as well as in FIGS. 1-16, the gimbal 10 includes a first arm 18 and a second arm 20 such that the first and second arms are able to rotate relative to each other about an axis 22. The first arm includes a free end having a handle mounting flange 24 or the like to which the handle 12 or the like may be mounted at an adjustable angle by tightening a handle fastener 24a or the like. When mounted to the first arm 18 and the handle fastener 24a is tightened, the handle 12 and first arm 18 remain fixed and stationary relative to each other. The opposite end of the first arm 18 includes a bearing shaft 26 which extends along and defines the axis of rotation 22.

The second arm 20 includes a proximal end 20a that forms part of a housing of a gearbox that is mounted about the bearing shaft 26 such that the second arm 20 is able to rotate about the bearing shaft 26. A fastener 28, such as a screw, mounts a gear 30 to the bearing shaft 26. The second arm 20 is captured on the bearing shaft 26 by the gear 30 between a pair of bearings, 32 and 34. According to an embodiment, the gear 30 remains stationary relative to the bearing shaft 26, while the second arm 20 is able to rotate relative to the gear 30.

A lid 36 cooperates with the a hollow section of the proximal end 20a of the second arm 20 to enclose the gear 30 therein and thereby define the gearbox 38. The lid 36 may be secured with fasteners to the second arm 20, or alternatively as illustrated, may have a resilient snap-fitting flange 36a that enables the lid 36 to be snap-fitted into position on the second arm 20 or removed therefrom by compressing said resilient flange 36a.

A rotary damper, such as a hydraulic rotary damper gear 42, is fastened to the lid 36 with fasteners or via snap-fitting flanges 40 in a position such that the gear teeth of the rotary damper gear 42 mesh with the gear teeth of the gear 30. Accordingly, when the lid 36 with the rotary damper gear 42 is affixed (i.e., snap-fit) to the second arm 20, both the lid 36 and rotary damper gear 42 rotate with the second arm 20 about the axis 22 defined by the bearing shaft 26. Further, since the gear teeth of the centrally-located gear 30 and rotary damper gear 42 are engaged, the rotary damper gear 42 travels around the periphery of the gear 30 and thereby dampens or slows the relative rotation between the first and second arms, 18 and 20, in a stable manner.

A camera, smartphone, or like device can be connected or mounted in tilt or roll positions (for instance, see FIGS. 5-15) above a distal end 20b of the second arm 20. As best shown in FIGS. 17-19, the distal end 20b of the second arm 20 has an opening or channel 44 through which a support or post 46 (to which a camera may be mounted) extends and is clamped and locked in position with an outer peripheral threaded collar or knob 48 that can be threaded onto the distal end 20b of the second arm 20 about the opening 44. According to an embodiment, the collar or knob 48 is tightened on a threaded hollow tube 52 extending from the distal end 20b of the second arm 20. The collar or knob 48 may be tightened against a taper to secure the support post 46 to the distal end 20b of the second arm. In addition, the thread hollow tube 52 may include a slit 54 to allow locking of an intermediate portion of the support post 46 to the second arm 20. This enables setting of a camera mount point (i.e., elevation) and balance correction of the camera. This also permits the support post 46 to be rotated relative to the second arm 20 to enable a camera to be switched between tilt and roll stabilization positions.

A threaded shaft 50 or the like may project from an upper end 46a of the support post 46 on which a separate camera holder or the like can be secured. By way of example, one type of camera holder 56 is shown in FIGS. 5-7 and 11-13 which interconnects a camera to a holder that screws onto the threaded shaft 50 of the support post 46 thereby interconnecting the bottom of the camera to the second arm 20 of the gimbal 10. Another type of camera holder 58 is shown in FIGS. 8-10 and 14-16 which is in the form of a clamp that clamps about a smartphone and screws onto the threaded shaft 50 of the support post 46. As stated above, the camera holders, 56 and 58, can be oriented in different positions relative to the second arm 20 such that the camera or smartphone can be arranged to tilt (angle downward or upward) in a so-called tilt position or roll (move side-to-side) in a so-called roll position as the first and second arms of the camera gimbal rotate relative to one another.

According to an embodiment, the support post 46 may include a lower end 46b opposite to the threaded shaft 50 that receives and holds a joint, such as a ball joint 60. A shaft 62 extends downward from the ball joint 60 on which one or more counter-balance weights 64 can be secured. The counter-balance weights 64 may be of a weight needed with the rotary damper to return or maintain the camera in an upright position in a stable manner.

According to an embodiment, the shaft 62 may include threads onto which the counterbalance weight or weights 64 may be screwed. Thus, the counterbalance weight or weights 64 may have a knurled outer surface for ready hand gripping. If desired, two counterbalance weights can be used and can be locked against each other using hand force.

Figure 20:
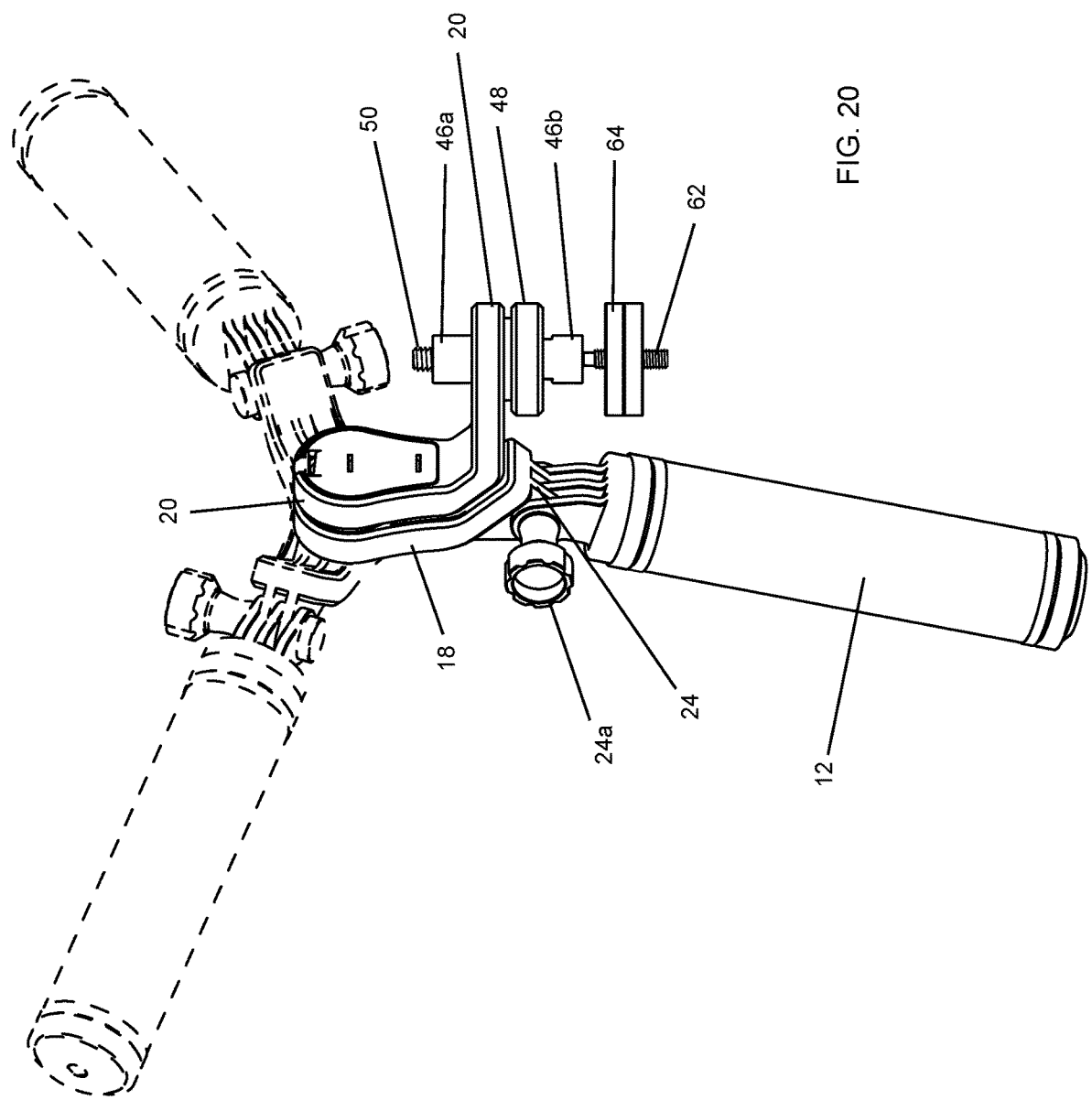
FIG. 20 is a perspective view of the camera gimbal and handle of FIG. 1 and the ability of the camera gimbal and handle to rotate 360° infinitely relative to each other.

According to the embodiment disclosed above, a portable gimbal is provided that does not require a power source and that is purely-mechanical relying solely on the force of gravity to automatically maintain or return the camera to a level image capturing position. For example, the movement of the first arm 18 and interconnected handle 12 may be permitted to rotate 360° infinitely about the second arm 20 on which a camera or smartphone may be mounted. See FIG. 20.

In addition, the damping characteristics of the gimbal 10 may be set to be properly used with different cameras of different weights and sizes and to provide adjustable damping, counterbalance characteristics, speed control, and balance correction.

Figure 23:
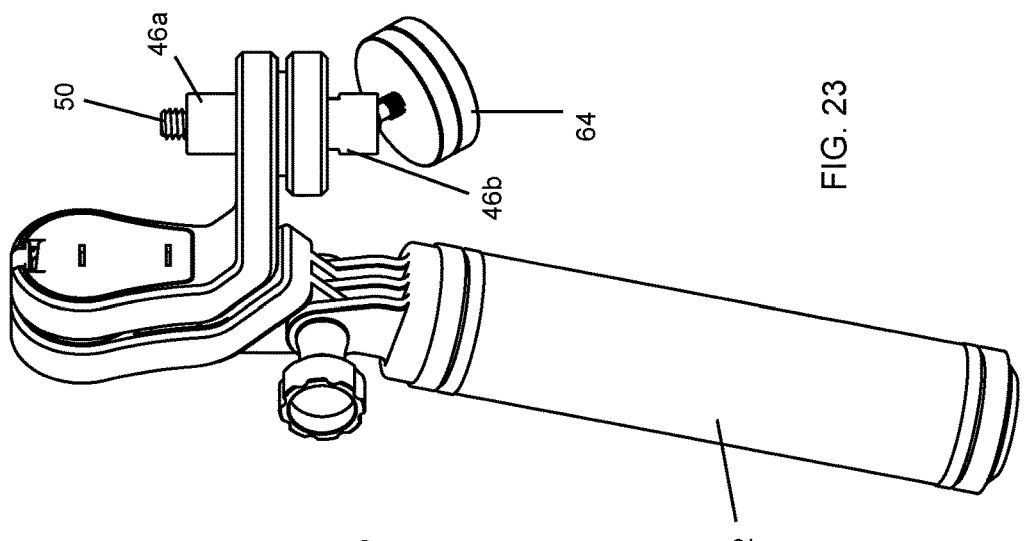
FIGS. 21-23 are perspective views of the camera gimbal and handle of FIG. 1 showing three different set positions (i.e., left, neutral, and right, respectively) of weights for providing balance correction, for instance, for a camera with an offset center of gravity.
Figure 22:
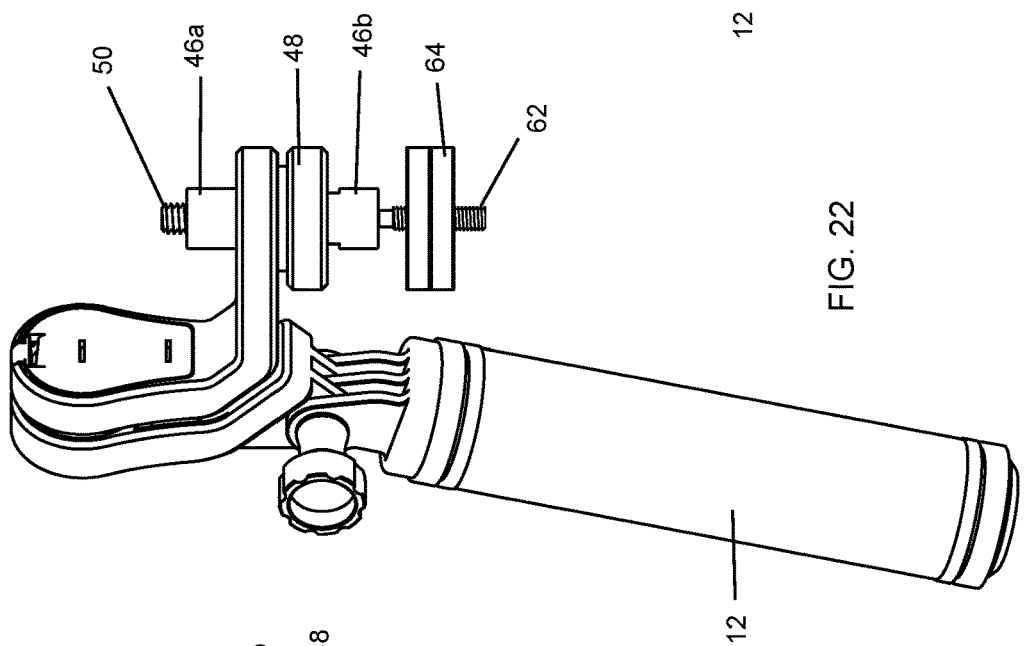
Figure 21:
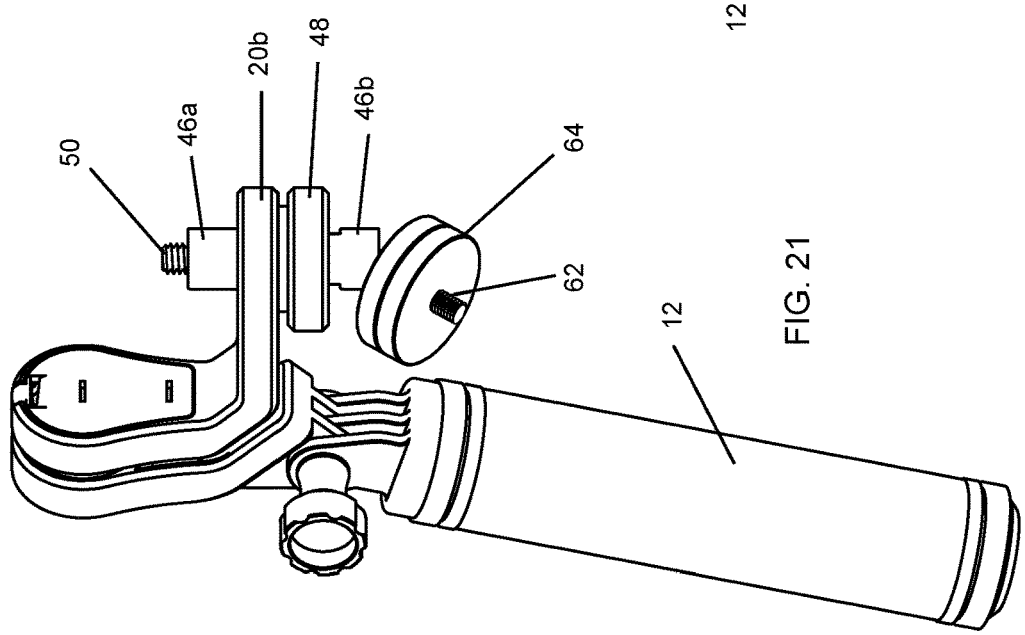
Figure 25:
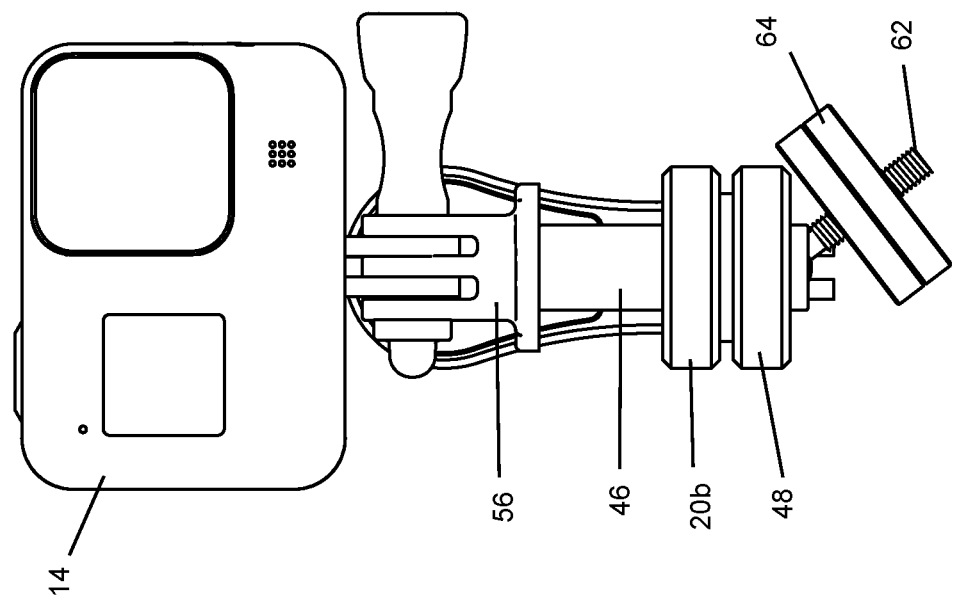
FIG. 25 is an elevational view of a camera having an offset center of gravity mounted on the camera gimbal and handle of FIG. 1 with use of balance correction (i.e., the weight tilted to the right)
Figure 24:
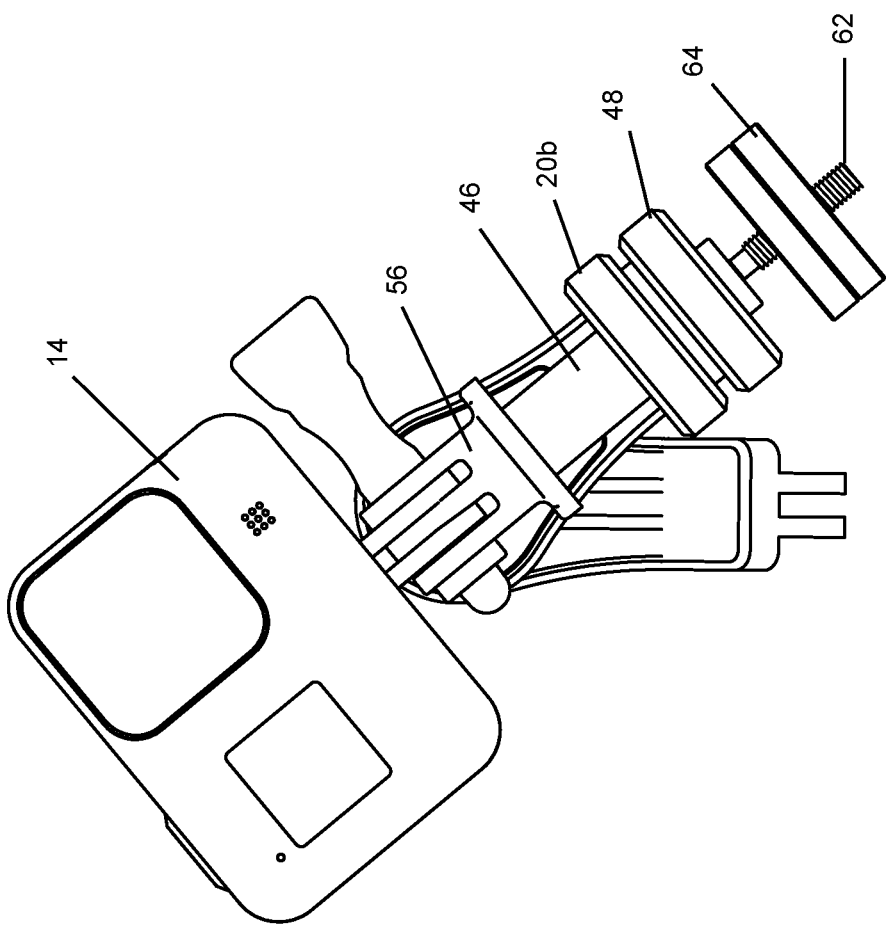
FIG. 24 is an elevational view of a camera having an offset center of gravity mounted on the camera gimbal and handle of FIG. 1 without use of balance correction (i.e., the weight set in a neutral position)

With respect to balance correction, FIGS. 21-23 illustrate the ability of the counter-balance weights 64 to be reposition, for instance, to balance a camera having an offset center of gravity. Thus, in FIG. 21, the ball joint 60 mounted within the lower end 46b of the support post 46 may be manually rotated such that the shaft 62 extending from the ball joint 60 is directed to the right as shown in the drawing. The ball joint 60 is retained in the support post 46 with sufficient tension to hold and retain its position when relocated. In the position shown in FIG. 21, the counterbalance weight 64 is offset to one side of the support post 46. In comparison, in FIG. 22, the ball joint 60 is rotated such that the shaft 62 extends straight downward in a neutral balancing position. In further comparison, in FIG. 23, the ball joint 60 within the support post 46 is rotated such that the shaft 62 extending from the ball joint 60 is directed to the left as shown in the drawing. The significance of these arrangements is best shown in FIGS. 24 and 25. In FIG. 24, the camera is tilted to the left because the center of gravity of the camera is located left of the support post 46. However, balance correction can be obtained by movement of the ball joint 60 within the support shaft 46 such that the shaft 62 extending from the ball joint 60 is retained in a position angled to the right as shown in FIG. 25 to relocate the counter balance weight 64. Thus, in FIG. 25, the camera is centered in a level position above the support post 46.

Figure 28:
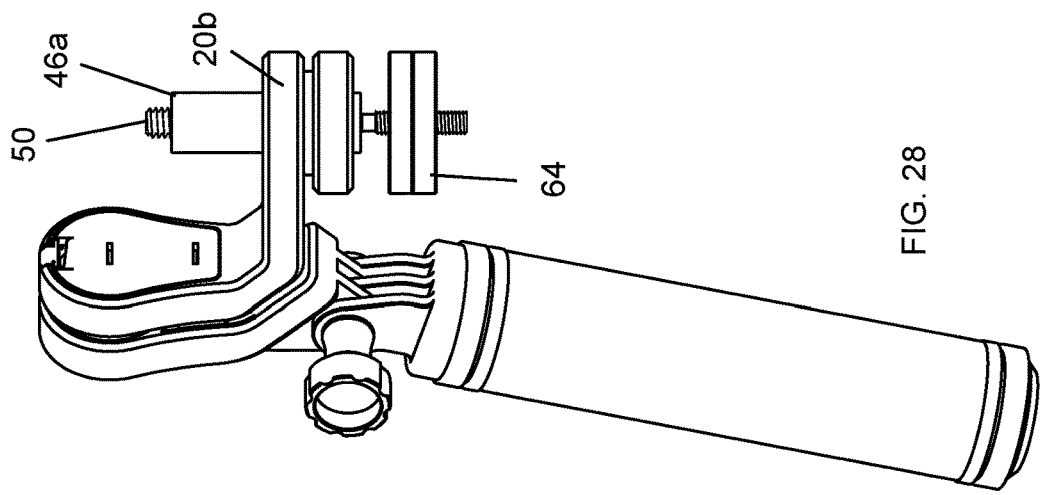
FIGS. 26-28 are perspective views of the camera gimbal and handle of FIG. 1 showing three different height positions (i.e., low, mid, and high, respectively) to which a camera may be mounted on the camera gimbal.
Figure 27:
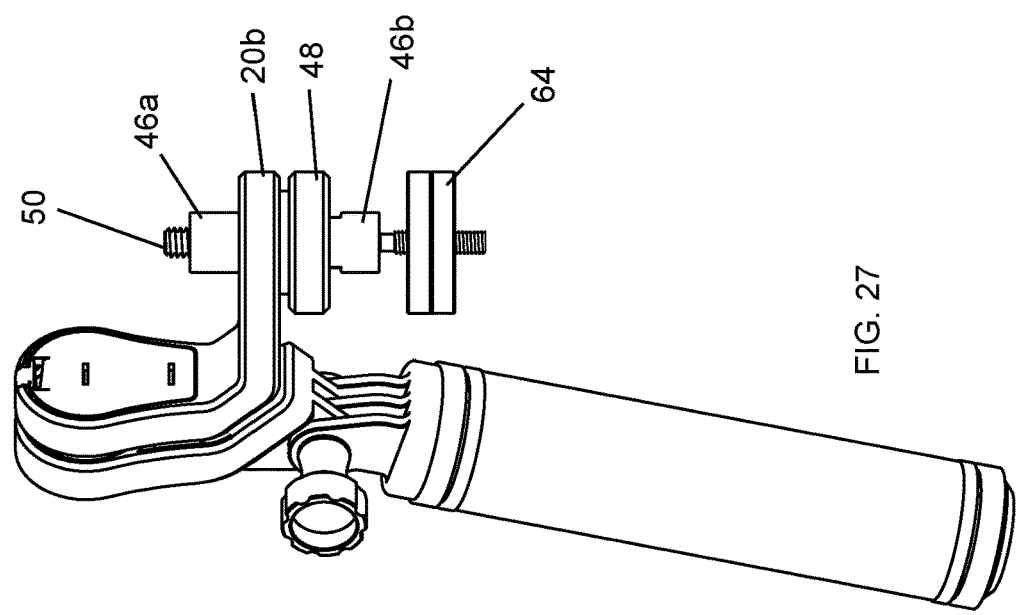
Figure 26:
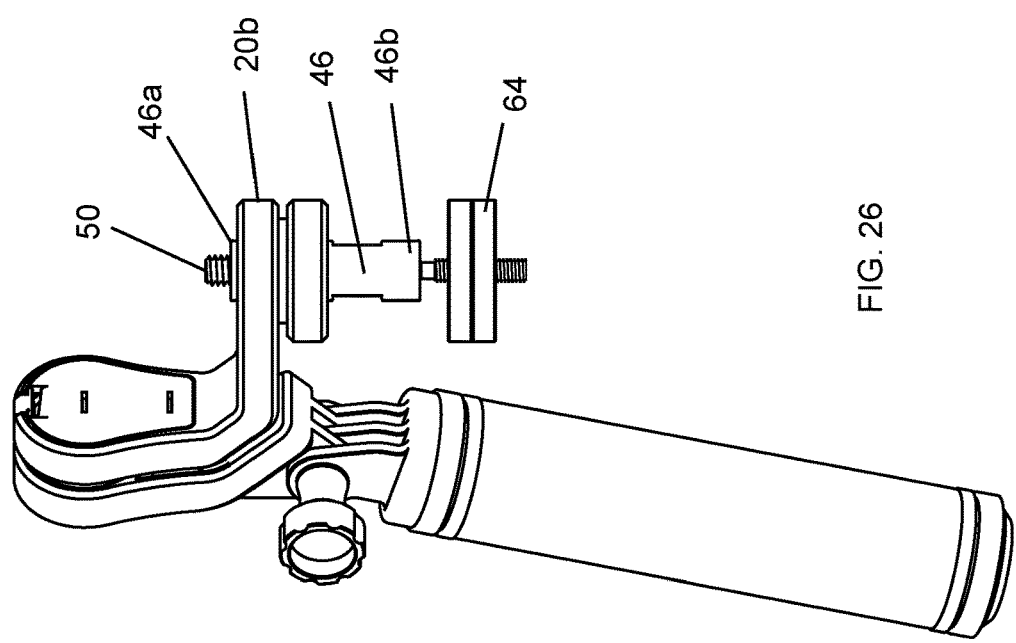

FIGS. 26-28 demonstrate the ability of the support post 46 to be raised relative to the distal end 20b of the second arm 20 such that the camera or smartphone may be elevated or lowered relative to the distal end 20b of the second arm 20 of the gimbal and the rotational axis 22 of the second arm 20 relative to the first arm 18. For instance, in FIG. 26, the support post 46 is shown secured in a lowermost position; whereas, in FIG. 28, the support post 46 is shown secured in an uppermost position, and in FIG. 27, the support post 46 is shown located at an intermediate height or position.

Figure 31:
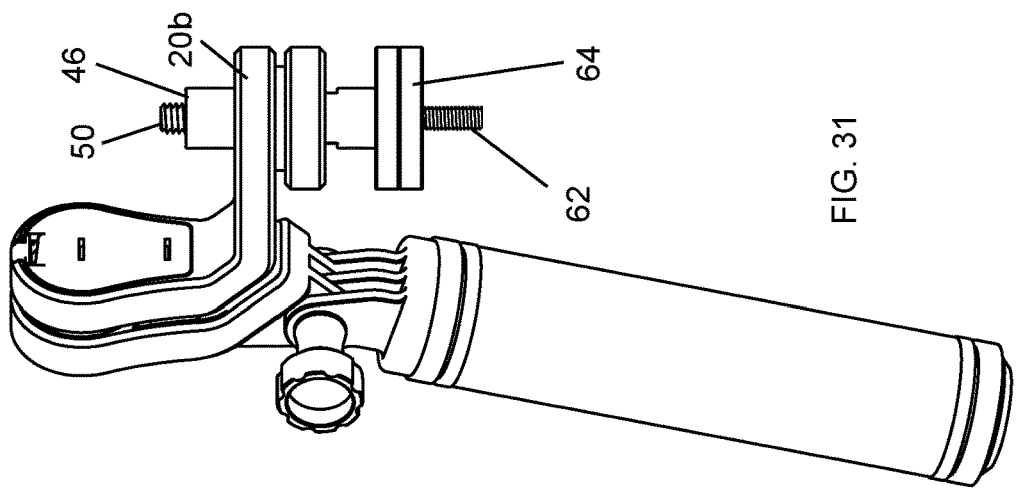
FIGS. 29-31 are perspective views of the camera gimbal and handle of FIG. 1 showing three different positions of the counter-balance weights (i.e., lowered, mid-location, and raised, respectively) for adjusting rotational speed (i.e., slow, medium, and fast, respectively) of the camera gimbal relative to the handle.
Figure 30:
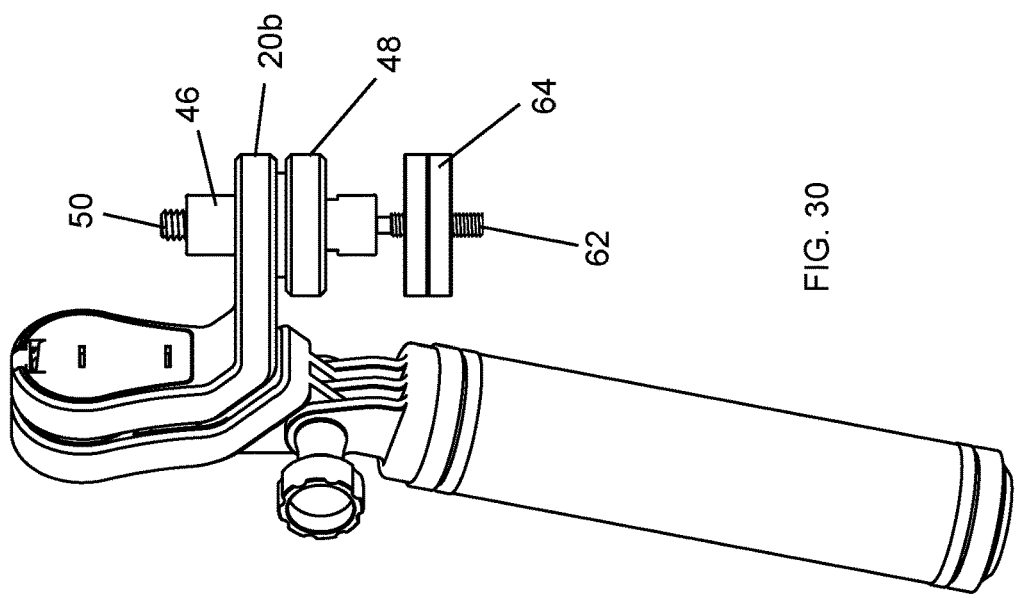
Figure 29:
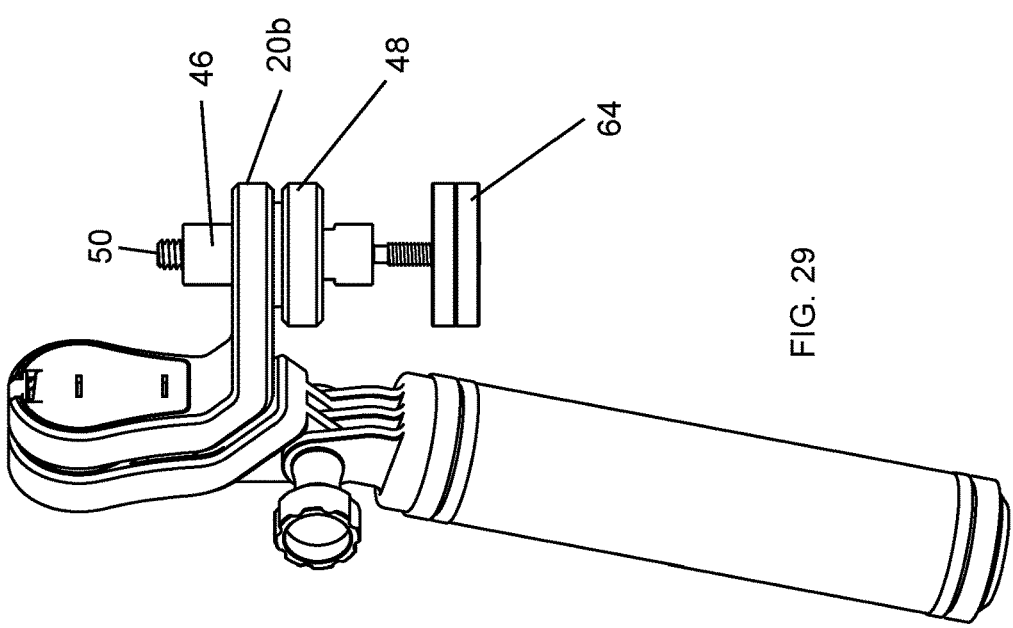

FIGS. 29-31 demonstrate the ability of the counter-balance weights 64 as well as the above referenced camera height adjustment to adjust the speed of rotation of the camera gimbal 10. As shown in FIG. 29, the support post 46 is secured in the intermediate height position and the counterbalance weight 64 is lowered to a lowermost position on the shaft 62 extending from the ball joint 60. Positioning the counterbalance weight 64 further down on the shaft 62 tends to increase rotational speed of the camera or smartphone. Conversely, as shown in FIG. 31, the support post 46 is secured in the intermediate height position and the counterbalance weight 64 is raised on an uppermost position on the shaft 62 extending from the ball joint 60. Positioning the counterbalance weight 64 further up on the shaft 62 tends to decrease rotational speed of the camera or smartphone. FIG. 30 shows an intermediate position of the counterbalance weight 64 for an intermediate rotational speed. These types of adjustments enable a large range of camera compatibilities depending upon weight of the camera and damping force of the rotary damper.

In addition to the above adjustments, the snap fit lid 36 of the camera gimbal 10 may be removed for purposes of disengaging the hydraulic stabilization and damping system. Accordingly, a camera or smartphone can be balanced in the roll position without the use of hydraulics if desired by the end user. This form of stabilization focuses on locating the center of gravity of the camera or smartphone slightly below the rotational axis 22 of the camera gimbal by using a combination of the above referenced balance adjustment, rotational speed adjustment, and camera mount height adjustment features. The adjustment of the counterbalance weight 64 also improves the ability of a user to quickly find a camera's appropriate center of gravity when using disengaged hydraulics.

The various components described above may be made of metallic or non-metallic materials, resins, plastic, composite materials, or the like. The above description illustrates an embodiment of how aspects of the present invention may be implemented, and are presented to illustrate the flexibility and advantages of particular embodiments as defined by the following claims, and should not be deemed to be the only embodiment. One of ordinary skill in the art will appreciate that based on the above disclosure and the following claims, other arrangements, embodiments, implementations, and equivalents may be employed without departing from the scope hereof as defined by the claims. Accordingly, the specification and figures are to be regarded in an illustrative rather than a restrictive sense, and all such modifications are intended to be included within the scope of the present invention. The present invention is defined solely by the appended claims and equivalents thereof.

I claim:

1. A camera gimbal, comprising:
    an elongate cylindrical support post to which a camera may be mounted;
    a gearbox having a gear secured to a bearing shaft and a rotary damper engaged with said gear in a manner permitting rotation of said rotary damper about a periphery of said gear and about an axis of rotation extending longitudinally through said bearing shaft and said gear;
    a first arm from which said bearing shaft extends; and
    a second arm rotatable relative to said first arm about said axis of rotation extending through said bearing shaft, said second arm having a proximal end portion forming a housing for said gearbox and a distal end portion to which said support post is connected such that one end of said support post projects above said distal end portion and an opposite end of said support post extends below said distal end portion;
    wherein said gear is secured to said bearing shaft in a fixed-position relative to said bearing shaft and said rotary damper is secured to said second arm at a fixed-location relative to the second arm;
    wherein said gear has a periphery with gear teeth and said rotary damper has a periphery with gear teeth, and wherein said gear teeth of said gear are engaged and mesh with the gear teeth of said rotary damper;
    wherein said distal end portion of said second arm has a channel extending therethrough through which said elongate cylindrical support post extends;
    wherein said support post can be captured to said channel at numerous locations along a length of said support post to adjust a height at which one of said ends of said support post projects above said distal end portion of said second arm; and
    wherein a handle mount extends from said first arm;
    whereby the camera gimbal is purely-mechanical in operation and is without connection to a power source relying on gravity acting on a camera mounted on said support to cause rotation of said first arm relative to said second arm to maintain the camera mounted on said support in a relatively level position while said rotary damper damps the rotational movement of said first arm relative to said second arm.

2. The camera gimbal according to claim 1, wherein a shaft extends from one of said ends of said support post and a counterweight is adjustably secured to said shaft such that said counterweight can be positioned closer to or further away from said distal end portion of said second arm.

3. The camera gimbal according to claim 2, wherein said shaft can be repositioned to extend to a laterally offset position relative to said support post to offset the position of the counterweight.

4. The camera gimbal according to claim 1, wherein said second arm includes a removable lid forming part of the housing of said gearbox, and wherein damping of the rotation of said second arm to said first arm is able to be disengaged when said lid is removed.

5. The camera gimbal according to claim 1, wherein a portable handle is secured to said handle mount of said first arm.

6. The camera gimbal according to claim 1, wherein said rotary damper is a hydraulic rotary damper gear.

7. The camera gimbal according to claim 1, wherein said elongate cylindrical support post is rotatable about a longitudinal axis extending through said support post relative to said distal end portion of said second arm to enable a camera to be mounted in different orientations on said distal end portion.

8. A camera gimbal, comprising:

a first arm to which a handle may be mounted;

a second arm having a proximal end portion interconnected to said first arm via a gearbox such that said second arm is rotatable relative to said first arm, said second arm including a distal end portion, and said gear box including a gear secured to a bearing shaft and a rotary damper engaged with said gear in a manner permitting rotation of said rotary damper about a periphery of said gear and about an axis of rotation extending longitudinally through said bearing shaft and said gear; and an elongate cylindrical support post having an intermediate portion extending through and securable to said distal end portion, first end to which a camera may be mounted, and an opposite second end;

wherein said distal end portion includes a threaded hollow tube to which a separate threaded knob can be secured and tightened to secure said intermediate portion of said support post to said distal end portion of said second arm at any location along a length of said intermediate portion such that a height at which said support post extends above said distal end portion of said second arm is adjustable;

whereby the camera gimbal is purely-mechanical in operation and is without connection to a power source relying on gravity acting on a camera mounted on said second arm to cause rotation of said first arm relative to said second arm to maintain the camera mounted on said second arm in a relatively level position while said rotary damper damps the rotational movement of said first arm relative to said second arm.

9. The camera gimbal according to claim 8, wherein said second end of the support post includes a shaft on which a counterweight is adjustably secured such that said counterweight can be secured on said shaft at positions closer to and further away from said distal end portion of said second arm for adjusting rotational speed of said second arm relative to said first arm.

10. The camera gimbal according to claim 8, wherein said gear is secured to said bearing shaft in a fixed-position relative to said bearing shaft and said rotary damper is secured to said second arm at a fixed-location relative to the second arm.

11. The camera gimbal according to claim 10, wherein said second arm includes a removable lid forming part of a housing of said gearbox, and wherein damping of the rotation of said second arm to said first arm is able to be disengaged when said lid is removed.

12. The camera gimbal according to claim 10, wherein a portable handle is secured to said first arm.

13. The camera gimbal according to claim 12, wherein said gear has a periphery with gear teeth and said rotary damper has a periphery with gear teeth, and wherein said gear teeth of said gear are engaged and mesh with the gear teeth of said rotary damper.

14. The camera gimbal according to claim 13, wherein said rotary damper is a hydraulic rotary damper gear.

\* \* \* \* \*